W. H. JOHNSON.
CHECK-ROW PLANTER.
No. 170,673. Patented Dec. 7, 1875.
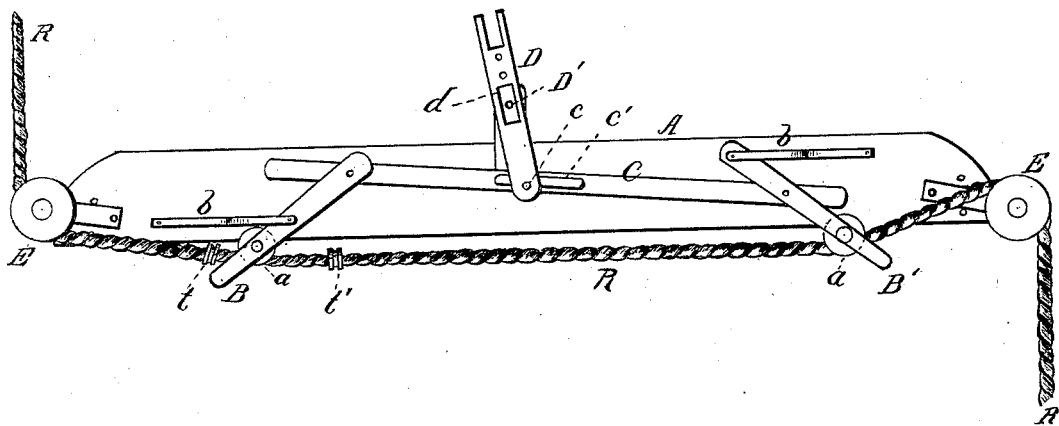
WITNESSES
INVENTOR
William H. Johnson.
By Leggett & Leggett
Attorneys.

UNITED STATES PATENT OFFICE.

WILLIAM H. JOHNSON, OF FARMER CITY, ILLINOIS.

IMPROVEMENT IN CHECK-ROW PLANTERS.

Specification forming part of Letters Patent No. 170,673, dated December 7, 1875; application filed September 4, 1875.

*To all whom it may concern:*

Be it known that I, WILLIAM H. JOHNSON, of Farmer City, in the county of De Witt and State of Illinois, have invented certain new and useful Improvements in Check-Row Attachment for Corn-Planters; and I do hereby declare the following to be a full, clear, and exact description of the invention, such as will enable others skilled in the art to which it pertains to make and use it, reference being had to the accompanying drawings, which form part of this specification.

My invention relates to seeders and planters; and consists of an attachment to be applied to seed-planters for operating the seed-slide at certain intervals as the machine passes over the field, as and for the purposes hereinafter more fully set forth and claimed.

Heretofore much trouble, expense, loss of time, and misplanting have been occasioned and experienced by the use of different forms of check-row attachments employing or using a single knotted rope stretched across the field, by the rope stretching, breaking, and also catching in its guides and the forked trippers or seed-slide-operating arms.

My invention is intended to overcome these objections, and to so construct the device as to insure perfect and positive action of the parts. In the first place, instead of constructing the line of tarred rope, hemp, manila, or such like material, I make it of twisted wire, and instead of using only one series of knots I use two—one for operating the device in one direction, and the other for operating in the return direction, so that the line need not be changed backward and forward each time in crossing the field, as it usually is, the ends each time only being moved up a certain distance to make a new row. I also provide the mouths of the forked arms with rollers to insure the passage through the arms of the knotted line after it has operated the seed-slide, thus preventing catching or sticking of the rope in the trippers.

In the drawings, Figure 1 is a plan view of the device complete; Fig. 2, a detached view of one of the forked arms.

A is a bar, of any desired or appropriate size, to fit upon the front of a seeder-frame. B B' are the forked arms, the one B' pivoted its at one end to the bar A by a yoke, *b*, and at center to a long bar, C, and the one B pivoted at its center by a similar yoke, *b*, to the beam A, and at its end to the bar C. D is an arm, which connects with the seed-slide. This arm is united to the bar C by a pin, *c*, working in a slot, *c'*, in the bar C, and is secured to bar A by a pin, D', passing through a slot, *d*, in the arm C. At each end of the bar A are pivoted grooved rollers E, which are allowed a slight limited lateral movement or play. The ends of the arms B are constructed or formed with a Y-shaped mouth, *e*, and provided with small grooved rollers *a*. R is the line passing around the rollers E at each end of the frame A, and extending across to each side of the field, where it is secured. This line is made of twisted wire, and provided at certain intervals with double series or two stops or knots, *t t'*.

The operation of the parts is as follows: The beam A, with the other portions secured thereto, as shown, is attached to the seeder-frame, with the line R in position, and secured at each end of the field. As the machine is moved forward in one direction the knots *t* engage in the mouth of one of the forked arms B, driving it to one side in the position represented in the drawings, the first knot *t* having just operated the arm B. The next knot *t* will then act on arm B', the knots *t'* sliding over the forked arms as they lie inclined forward, thus operating the seed-slide back and forth in the usual manner. The first series of the knots, *t*, in the line are to operate the device in one direction of the machine, and the other series, *t'*, are to operate the trippers in the return movement. Thus it will be observed that the dropping of the seed, or the operation by each knot, is insured in both directions of the machine. The small rollers *a* prevent the line from catching in the mouth of the arms B, and insure the passage of the line therethrough after the trippers have been actuated. The wire-rope prevents stretching or breaking, and consists in holding the device straight in place.

The object of thus providing two sets of knots, *t t'*, is, that in the ordinary line, where only one knot is used, in turning around at the end of the field, a certain length or space is lost or taken up in the line, so that the knots are not in proper position to drop the seed correctly in the reverse direction of the machine, as they were in the first instance. I provide these double series of knots, therefore, at the proper position, so as to take up or compensate for this loss, so that in turning around at the end of the field the second knot of the pair will be in proper position, so as to drop the seed correctly.

Having thus described my invention, what I claim as new, and desire to secure by Letters Patent, is—

1. In combination with the connecting-arm C, slotted at its center, and pivoted slotted arm D, the trippers B B', pivoted at their center and ends to the arm C and frame A, and constructed with Y-shaped mouth and grooved pulleys $a$, as and for the purpose described.

2. In combination with the trippers B, with grooved rollers $a$, and frame A, with rollers E, the line R, with sets or pairs of separate knots $t\ t'$, for operating the seed-dropping devices in a forward and backward direction, as described.

In testimony that I claim the foregoing I have hereunto set my hand this 20th day of August, 1875.

W. H. JOHNSON.

Witnesses:
 JOHN D. GOULD,
 GEO. W. TAYLOR.